United States Patent [19]

Stas et al.

[11] Patent Number: 6,025,869
[45] Date of Patent: *Feb. 15, 2000

[54] VIDEO VIEWING SUPERVISION SYSTEM

[75] Inventors: Stefan Stas, Long Valley; James M. Brian, Newton, both of N.J.

[73] Assignee: Music Corporation, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/700,200

[22] Filed: Aug. 20, 1996

Related U.S. Application Data

[63] Continuation-in-part of application No. 08/369,001, Jan. 5, 1995, Pat. No. 5,548,345.

[51] Int. Cl.$^7$ .................. H04N 7/16; H04N 5/50
[52] U.S. Cl. ................ 348/5.5; 348/569; 348/570; 348/906; 380/20
[58] Field of Search .................. 380/20; 348/9, 348/5.5, 569, 570, 716, 734, 725, 906

[56] References Cited

U.S. PATENT DOCUMENTS

| | | | |
|---|---|---|---|
| 4,081,754 | 3/1978 | Jackson | 325/396 |
| 4,228,543 | 10/1980 | Jackson | 455/181 |
| 4,620,229 | 10/1986 | Amano et al. | 358/194.1 |
| 4,706,121 | 11/1987 | Young | 358/142 |
| 4,751,578 | 6/1988 | Reiter | 358/183 |
| 4,977,455 | 12/1990 | Young | 358/142 |
| 5,001,554 | 3/1991 | Johnson et al. | 358/86 |
| 5,038,211 | 8/1991 | Hallenbeck | 358/142 |
| 5,151,789 | 9/1992 | Young | 358/194.1 |
| 5,168,372 | 12/1992 | Sweetser | 358/349 |
| 5,307,173 | 4/1994 | Yuen et al. | 358/335 |
| 5,335,079 | 8/1994 | Yuen et al. | 358/335 |
| 5,353,121 | 10/1994 | Young et al. | 348/563 |
| 5,373,324 | 12/1994 | Kuroda et al. | 348/468 |
| 5,382,983 | 1/1995 | Kwoh et al. | 348/716 |
| 5,475,382 | 12/1995 | Yuen et al. | 340/825.72 |
| 5,479,266 | 12/1995 | Young et al. | 358/335 |
| 5,479,268 | 12/1995 | Young et al. | 358/335 |
| 5,515,173 | 5/1996 | Mankovitz | 358/335 |
| 5,519,780 | 5/1996 | Woo et al. | 380/49 |
| 5,532,732 | 7/1996 | Yuen et al. | 348/1 |
| 5,532,754 | 7/1996 | Young et al. | 348/569 |
| 5,539,391 | 7/1996 | Yuen | 340/825.72 |
| 5,550,576 | 8/1996 | Klosterman | 348/6 |
| 5,552,837 | 9/1996 | Mankovitz | 348/734 |
| 5,553,123 | 9/1996 | Chan et al. | 379/102 |
| 5,559,550 | 9/1996 | Mankovitz | 348/6 |
| 5,585,838 | 12/1996 | Lawler et al. | 348/12 |
| 5,589,892 | 12/1996 | Knee et al. | 348/906 |
| 5,596,373 | 1/1997 | White et al. | 348/7 |
| 5,600,364 | 2/1997 | Hendricks et al. | 348/9 |
| 5,619,274 | 4/1997 | Roop et al. | 348/461 |
| 5,619,383 | 4/1997 | Ngai | 360/20 |
| 5,694,176 | 12/1997 | Bruette et al. | 348/906 |
| 5,781,246 | 7/1998 | Alten et al. | 348/569 |

*Primary Examiner*—Stephen C. Buczinski
*Attorney, Agent, or Firm*—Skjerven, Morrill, Macpherson, Franklin & Friel LLP; Edward C. Kwok

[57] ABSTRACT

A TV/video viewing supervision system that enables a supervisor, typically a parent controlling children's viewing, to selectably program the hours, programs and/or channels of television, VCR, cable TV, satellite TV and/or game viewing that are allowed and/or blocked from viewing by comparing the signal source identification code embedded in the video signal with a programmed list of channels to be blocked. The system features a channel/time matrix that can be programmed with a keypad-controlled cursor of a hand-held remote unit to set up a viewing schedule for future time period, for example a coming week.

10 Claims, 14 Drawing Sheets

VIDEO VIEWING SUPERVISION SYSTEM

RELATED APPLICATIONS

This application is a continuation-in-part of U.S. patent application Ser. No. 08/369,001, filed Jan. 5, 1995, which issued as U.S. Pat. No. 5,548,345, on Aug. 20, 1996.

BACKGROUND OF THE INVENTION

1. Field of the Invention

The present invention relates to the field of home video entertainment and more particularly it relates to systems for controlling the viewing of television programs, by controlling the operations of television receivers and associated equipment, such as but not confined to cable converters ("cable boxes"), satellite converters ("satellite boxes"), VCRs and video games.

2. Discussion of the Related Art

It has become increasingly important to mechanically control, on an ongoing basis, the television and video viewing activities of children, especially at times when personal parental supervision cannot be provided. Ideally, parents and children should agree upon ground rules regarding the channels that the children can watch, the permitted viewing times, and the total viewing time permitted each day, week or month. However, even with such agreement, effective management and enforcement are difficult, especially for busy working parents.

Programmable television receiver controllers for limiting television viewing were disclosed by J. N. Jackson in U.S. Pat. Nos. 4,081,754 and 4,228,543 wherein a digital control clock selects stored instructions regarding selection or blocking of television channels at specified time intervals presettable in half-hour steps throughout a predetermined time period, such as a one week. The '754 patent discloses and claims random access memory means, control and data lines, clock means, control meaner first and second program means and channel selection entry means. The '543 patent discloses and claims random access memory means, storing means, read means and control means for controlling a television receiver according to data read from the memory means.

One group of U.S. patents teach the control of viewing time, without selective restriction on specific television channels. This group of patents include U.S. Pat. Nos. 5,060,079 and 4,345,696 to Beierto Rufus-Isaacs. These patents disclose monitoring or recording viewing time, up to a total time allotment, and display the permitted remaining viewing time. Another group, exemplified by U.S. Pat. Nos. 5,168,372 and 5,051,837 to Sweetset and McJunkin, respectively, allows selection of time periods allowable for television viewing. Optionally, in these disclosures, different viewers may be identified and assigned different customized time allotments for television viewing. Yet another group of U.S. patents, e.g. U.S. Pat. No. 4,718,107 to Hayes, and U.S. Pat. No. 5,053,884 to Kamijyo, discloses controlling the channels viewed without restriction on day or total viewing time.

U.S. Pat. No. 4,510,623 to Bonneau et al for a TELEVISION CHANNEL LOCKOUT teaches user inputting a non-volatile memory for inhibiting viewing of selected channels for a predetermined period of time, but utilizes only a conventional alpha-numeric display device.

There is an unfilled need for a viewing controller system that allows the parent comprehensive and user-friendly control for programming selected channels and permitted viewing times for a predetermined future time period. e.g. the coming week, with a display capability that provides a graphical display showing the channel/permitted viewing time relationship.

SUMMARY OF THE INVENTION

A television (TV) and video viewing supervision system of the present invention includes an apparatus that enables a supervisor (typically a parent controlling children's viewing) to selectably specify the hours, the programs and the channels of television broadcast, video tape, cable TV, satellite TV and game video viewing that are permitted or blocked from viewing. In accordance with one aspect of the present invention, the source of a video signal entering into the apparatus is identified by an identification code in a data packet transmitted during a blanking interval. The TV and video viewing supervision system blocks access when the identification code matches those in a predetermined list of blocked channels.

The entertainment system of the present invention, which includes a channel/time matrix that can be displayed on the video/television viewing screen, can be programmed using a keypad-controlled cursor of a hand-held remote unit to set up a viewing schedule for a future time period of a predetermined duration (e.g. a coming week, in half-hour durations). The present invention provides a user-friendly system for controlling both viewing time and channel selection for a future time period. In addition, the present invention provides a user with an easily generated time and channel selection matrix covering a wide range of future time periods and channels. The present invention also provides the user with the option of either blocking selected channels and time periods or allowing selected channels and time periods. Further, the present invention provides a graphical display that shows a selected channel's allowed or blocked time periods and gives other detailed status information.

The above features of the present invention will be more fully understood from the following description taken with the accompanying drawing.

BRIEF DESCRIPTION OF THE DRAWINGS

FIG. 2a is an exemplary embodiment of the remote control unit 12 referenced in FIG. 1a.

FIG. 2b is an alternate embodiment of the remote control unit 30 referenced in FIG. 2a.

FIG. 2c is an exemplary block diagram of the remote control unit 12 referenced in FIG. 2a.

FIG. 3 illustrates main control unit 10 referenced in FIG. 1a.

DETAILED DESCRIPTION OF THE INVENTION

Figure 1A:
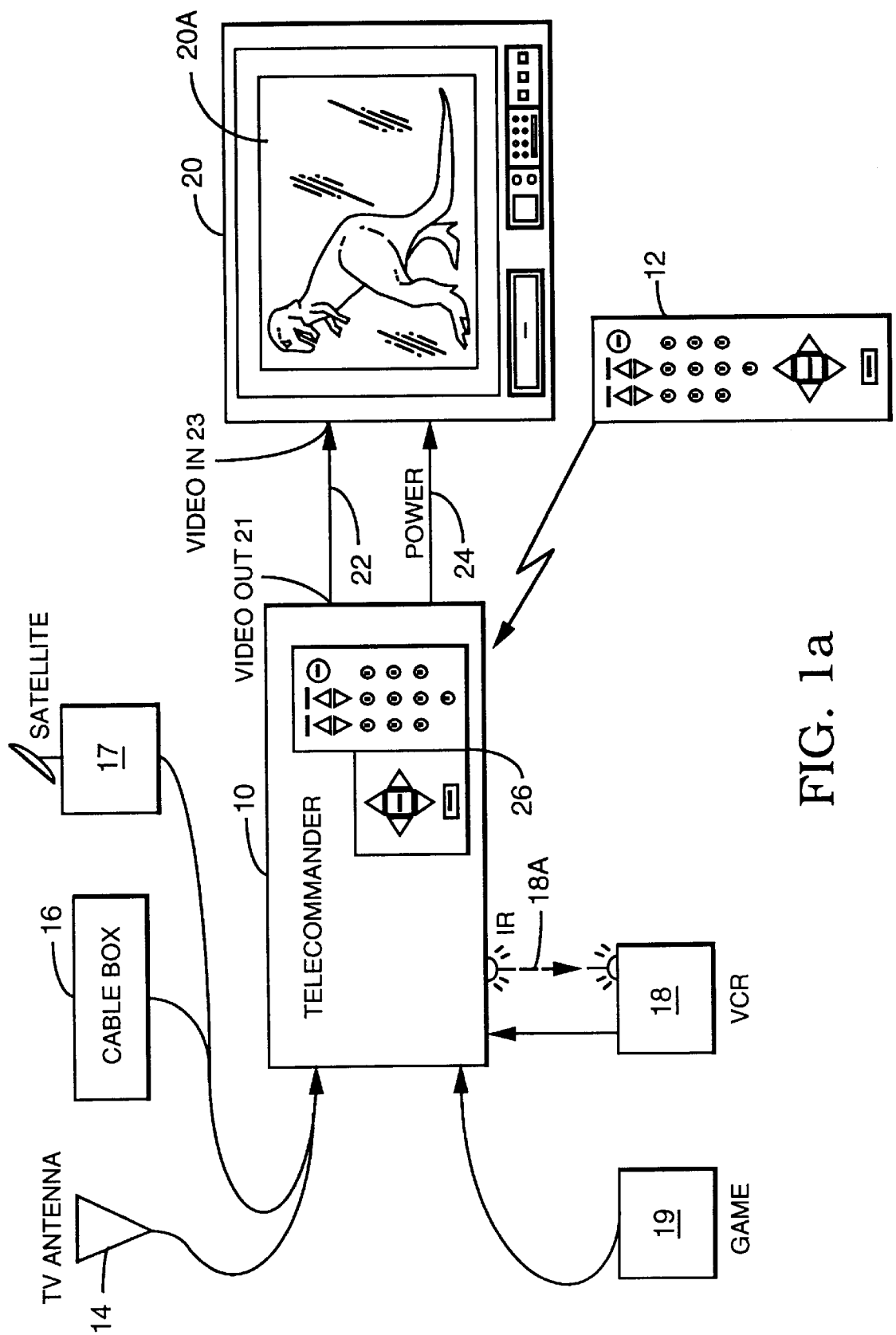
FIG. 1a is a system block diagram of an exemplary embodiment of the present invention.

An apparatus and a method for implementing a video viewing supervision system within an entertainment system are described. FIG. 1a illustrates an embodiment of the present invention, a main control unit ("TeleCommender") 10 and remote control unit 12 of the present device connected into a typical TV home entertainment system. Main control unit 10 contains a cable-compatible electrically controlled television signal tuner, receiving an input signal from a conventional antenna 14, or a cable television source, e.g. a conventional cable decoder/converter box 16, a satellite receiver box 17 or a video cassette recorder (VCR) 18. Even though antenna 14, cable box 16 and satellite 17 are illustrated as being simultaneously coupled to main control unit 10, typically only one of these video sources is used. Alternatively, a selection capability to allow the user to select between antenna 14, cable box 16 and satellite box 17 may be provided.

VCR 18 may be operationally controlled via an infra-red (IR) link 18A from main control unit 10, and by other peripheral units, such as video game player 19 or any multimedia equipment. Remote control unit 12 allows the parent to program unit 10 and the child to change channels and volume at a distance from main control unit 10 and TV receiver 20.

The "arrow" and "Enter" keys on each of main control unit 10 and remote control unit 12 are only active in the Program mode and not active in the Supervised Viewing or Full Access modes. These various modes will be described in more detail in the description accompanying FIG. 6a. The keys on main control unit 10 are functionally identical to the keys on remote control 12. A conventional TV receiver 20 (which may include certain other capabilities, e.g. a VCR) receives (i) a composite audio and video signal from main control unit 10, via coaxial cable 22 coupled to "Video Out" connector 21, and (ii) AC power, via power line 24. Thus main control unit 10 can control viewing of television programs on monitor 20A of TV receiver 20 by interrupting either the composite input signal on coaxial cable 22, or the A.C. power on power line 24.

"Video Out" connector 21 on main control unit 10 permits connection of the selected video to an external monitor and may be an RCA jack carrying an NTSC composite signal. The output video signal may be provided at Video Out connector 21 using a 75 Ω "F" type connector. Main control unit 10 may include an internal video tuner for the selecting a video signal. When a video tuner is provided in main control unit 10, a modulated video signal carried by the carrier of a selected channel frequency can be shifted for output to TV receiver 20 using a predetermined channel frequency, such as channel 3 or 4. This predetermined channel frequency is selected via a switch located on the rear panel of main control unit 10.

A second keypad 26 is shown provided on main control unit 10. Main control unit 10 can operate from either the remote control unit 12 or keypad 26 of main control unit 10.

The entertainment system can be designed to provide either or both. Furthermore, main control unit 10 can be programmed to control VCR 18, e.g. directing VCR 18 to record from a specified channel at a selected time period. Programming of main control unit 10 can be performed using commands input from either remote control unit 12 or keypad 26. The user can introduce any externally generated composite NTSC video signal into the composite video input port 23. Input video signals may originate from video game player 19, VCR 18, a camcorder (not shown), TV receiver 20 or any other devices capable of producing a compatible composite signal. The input signal received by main control unit 10 preferably has an amplitude of 1 volt peak-to-peak, high input impedance, and is unterminated.

Main control unit 10 may also include a tamperproof locked enclosure for enclosing the input and output connections, so as to prevent unauthorized attempts to bypass the signal and power connections on main control unit 10. Unit 10 may be implemented with a suitably programmed microprocessor. Optional refinements include channel grouping capabilities, capability of controlling both cable box 16 and VCR 18 (e.g. via its IR link) from the main control unit 10.

As indicated above, main control unit 10 can be implemented as a separate unit of the entertainment system, being provided its own enclosure box. Alternatively, main control unit 10 can also be incorporated into another system element such as TV receiver 20 or cable box 16, reducing the overall system cost by reducing the number of TV tuners and enclosure boxes in the entertainment system.

Figure 1B:
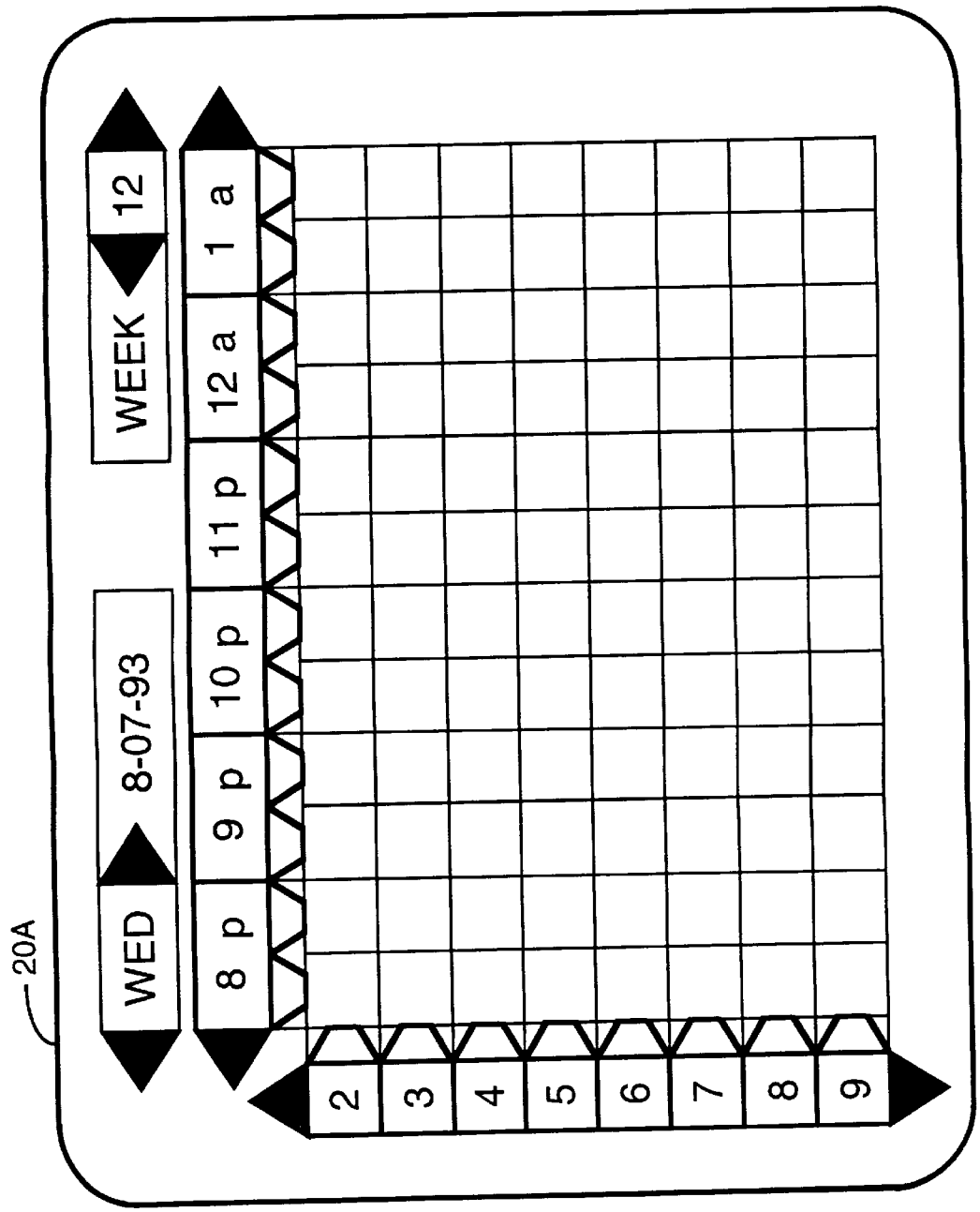
FIG. 1b illustrates an exemplary embodiment of a selection matrix of the present invention.

FIG. 1b illustrates an exemplary selection matrix which may be displayed on monitor 20A of TV receiver 20. A more detailed description of the selection matrix will be provided in the description below in conjunction with FIGS. 7 through 11.

Figure 2A:
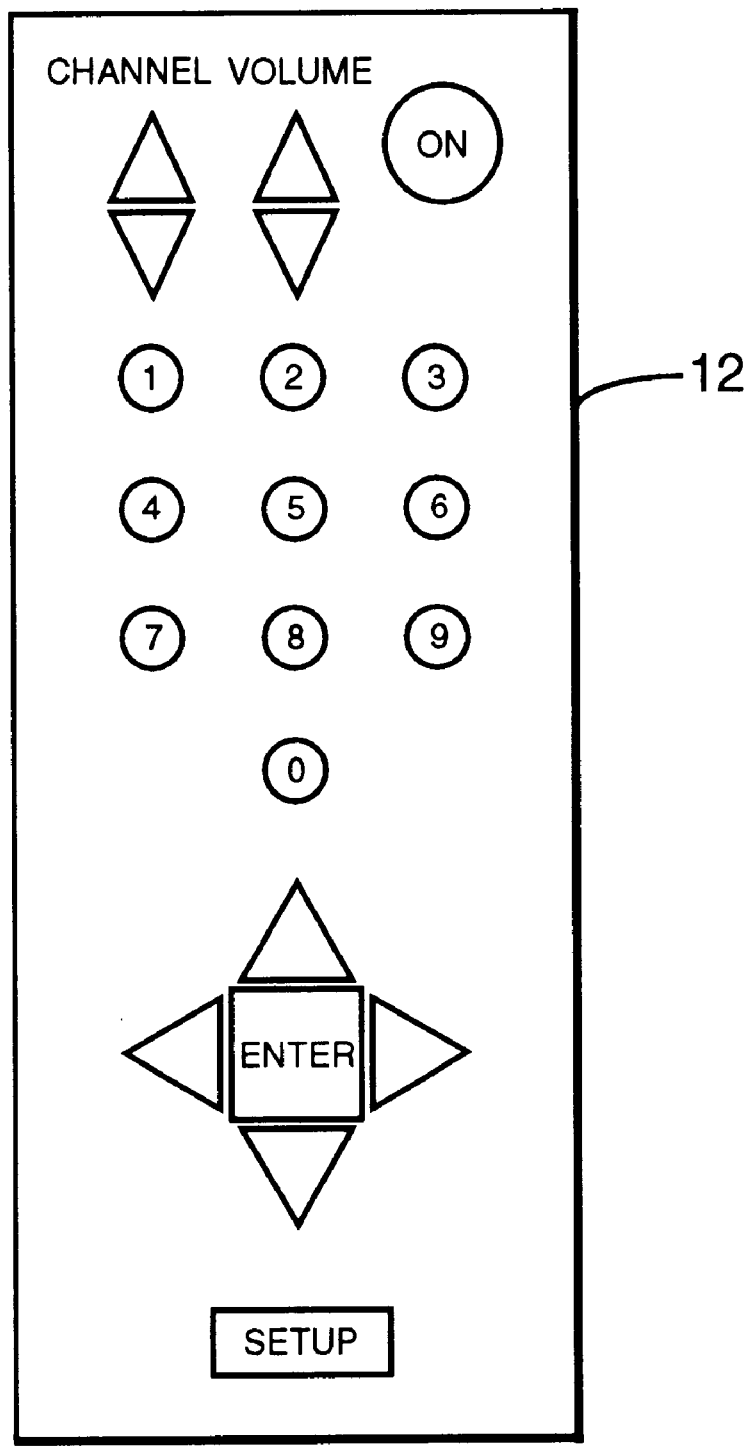

FIG. 2a illustrates the exemplary remote control unit 12 referenced in FIG. 1a. Remote control unit 12 has a keypad which includes control keys for issuing commands to main control unit 10. As shown in FIG. 2a, remote control 12 includes 10 keys numbered 0 through 9, 2 "channel" up-down keys, 2 "volume" up-down keys, an "on-off" key, a "setup" key, four cursor control keys and an "enter" key, for a total of 21 keys and thus 21 associated key operated switches. In this embodiment, the keypad on remote control unit 12 is the same as the keypad 26 on the unit 10, and accordingly the function of each individual key will be later described with respect to keypad 26 of main control unit 10.

Figure 2B:
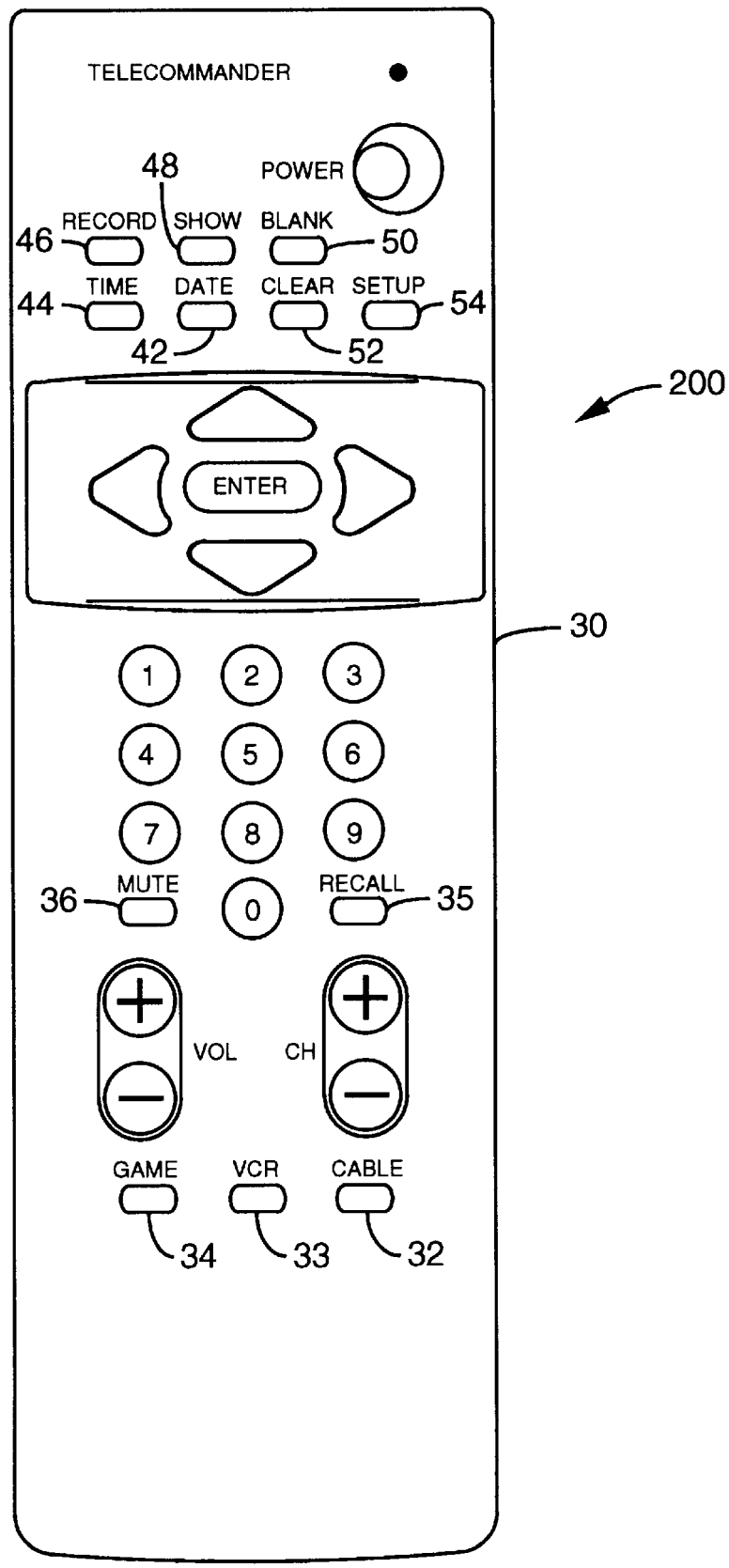

FIG. 2b illustrates another exemplary remote control unit 30. In remote control unit 30, additional keys not present on remote control unit 12 are provided, including "cable" key 32, "VCR" key 33, "game" key 34, "recall" key 35, "mute" key 36, "date" key 42, "time" key 44, "record" key 46, "show" key 48, "block" key 50, "clear" key 52 and "setup" key 54. "Cable" key 32, "VCR" key 33 and "game" key 34 are intended for use in selecting the source of the composite video/audio input signal. "Time" key 44 and "date" key 42, "show" key 48, "block" key 50, "clear" key 52 and "setup" key 54 may be used during the Program mode to select the times and channels for which viewing is to be controlled.

Figure 2C:
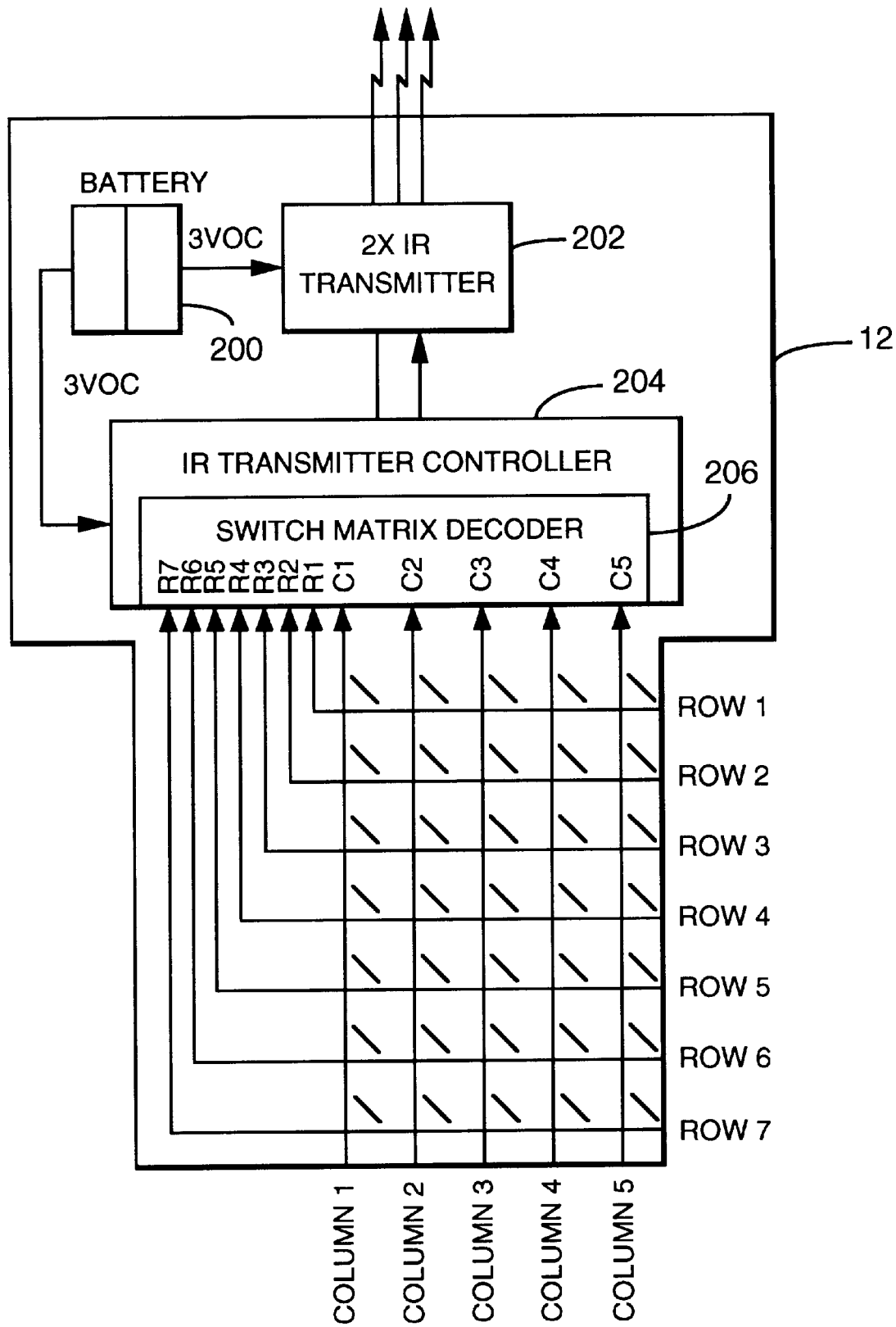

FIG. 2c illustrates an exemplary block diagram of FIG. 2a's remote control unit 12. Battery 200 is coupled to infrared ("IR") transmitter 202 and IR transmitter controller 204. Switch matrix decoder 206 is provided for decoding, in this embodiment, 35 switches in a 5 by 7 logical matrix of switches corresponding to the keys on the remote control unit 12. The switches of the logical matrix, which is organized as a rectangular matrix of switches, corresponds to the physical keys shown in FIG. 2a. As can be seen in FIGS. 2a and 2c, while the matrix and matrix decoder 206 may accommodate up to 35 switches, only the 21 are actually used in this embodiment. The switch decoder 206 decodes commands from the user by detecting the key or keys depressed on the keypad of remote control unit 12. IR transmitter controller 204 enables IR transmitter 202 to transmit the output signal of switch matrix decoder 206, i.e. data representing the key or keys depressed, to main control unit 10. IR remote control units for TV receivers, VCRs and similar devices, and the circuits therefor are well known and therefore are not further described herein.

Figure 3:
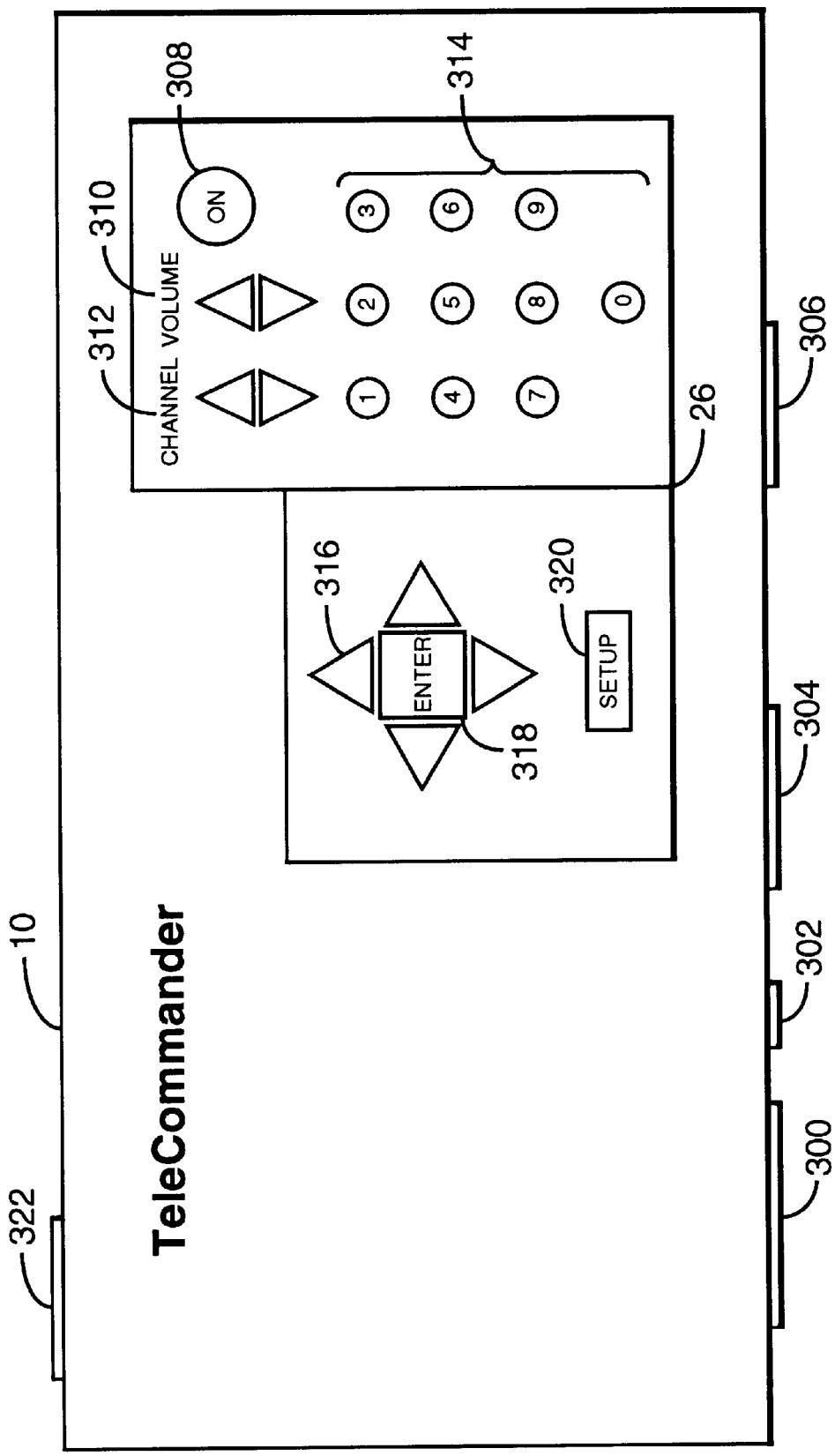

FIG. 3 illustrates main control unit 10 of FIG. 1a. The exemplary implementation of main control unit 10 illustrated in FIG. 3 includes a "mode" keyswitch 300 which allows a parent to choose among three operating modes respectively identified as "supervised viewing", "full access", and "program" modes. Mode keyswitch 300 on main control unit 10 allows the parent to activate the program mode using a key. In this embodiment, the parent cannot inadvertently leave main control unit 10 in the program mode as the key cannot be removed when main control unit 10 is in the program mode. The key can be removed from mode keyswitch 300 by the parent after setting the position of mode keyswitch 300 to activate the supervised viewing mode. Alternative, a personal identification number (PIN) may be set up at the set-up stage (described in more detail for the description accompanying FIG. 6a), which allows a parent to enter into any of the program mode, the supervised viewing mode and the full access mode using the PIN and either keypad 26 of main control unit 10 or remote control unit 12.

Power-on switch 308 may be a push-on, push-off type keyswitch. When power is activated, LED indicator 302 comes on. Alternatively, channel display 304, a three-digit LED numerical display, may be activated to indicate that the power is on. Channel display 304 displays the number of the channel currently selected by the tuner in main control unit 10. In either case, these indicators are preferably viewable from the front of the main control unit 10, as main control unit 10 is typically placed on or near the TV receiver 20 (FIG. 1). Once on, main control unit 10 is frequently operated via the remote control unit 12. In that regard, remote control receiver window 306, also preferably placed on the front face of main control unit 10, allows remote control unit 12's IR signal to be detected by an IR detector located behind remote control receiver window 306.

Power on-off switch 308 controls power both to main control unit 10 and to conventional TV receiver 20, which is connected to the switched power outlet of main control unit 10, as is shown in FIG. 1a. A pair of "volume" keys 310 are provided for adjusting (i.e., increase or decrease) the volume level of the audio signal. Keys 312 are provided for channel selection relative to the current channel. The functions of audio volume control and channel selection, and the circuits for providing these functions, are well-known. Keys 314 for digits 0 through 9 are used for entering channel numbers, date, time and any other numerical inputs. Up, down, left and right cursor arrow keys 316 control the position of a cursor displayed on, for example, TV monitor 20A under the program mode. The "Enter" key 318 allows a parent to select, in the program mode, an entry indicated by the position of the cursor. Set-up key 320 is used to set main control unit 10 to program mode. Typically, on the rear panel of main control unit 10, a two-position slide switch 322 is coupled to a modulator in main control unit 10. Two-position switch 322 selects a channel (typically, channel 3 or channel 4) whose carrier signal is used to modulate the output video signal of main control unit 10.

Figure 4:
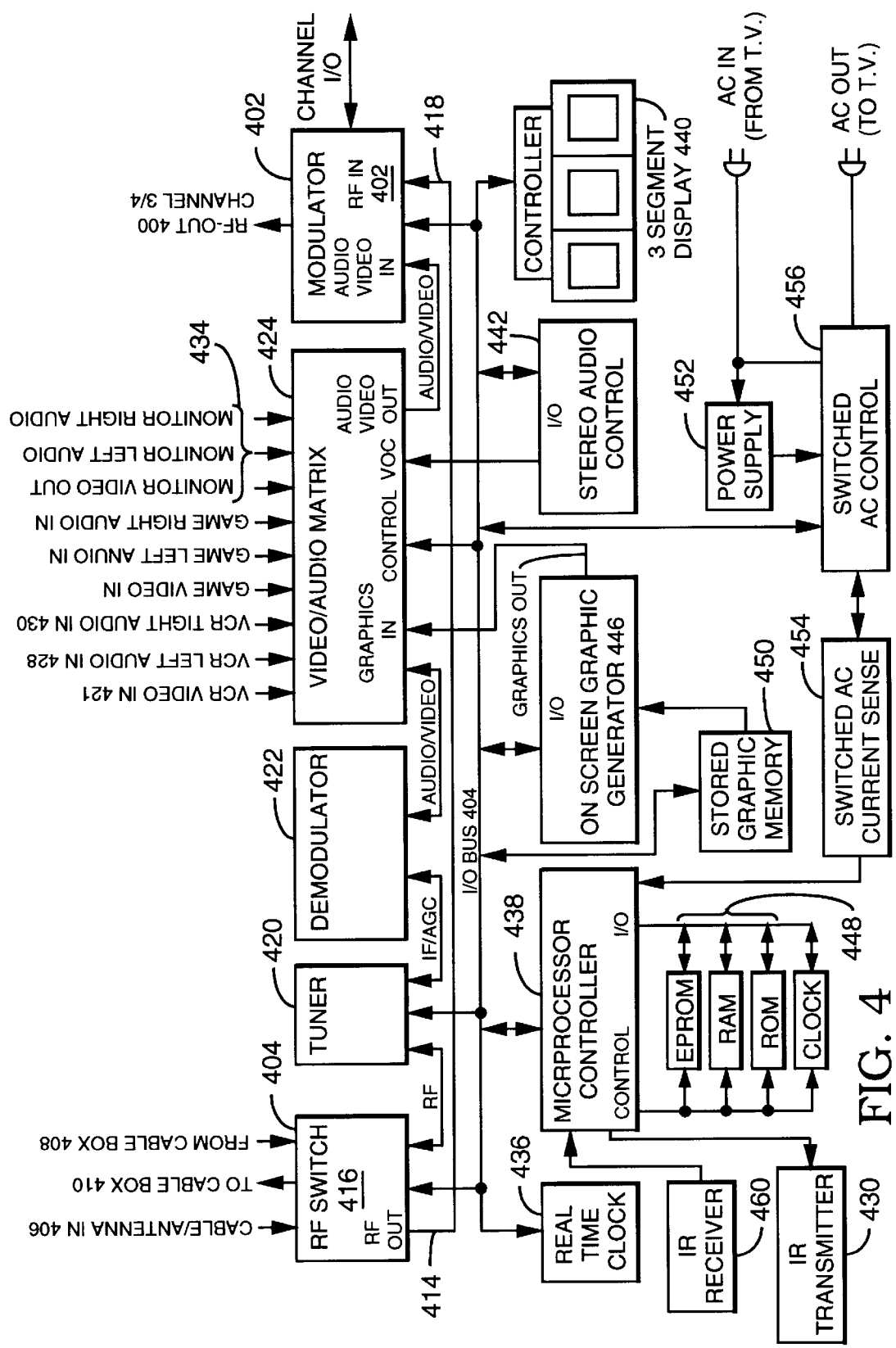
FIG. 4 is a block diagram of main control unit 10 illustrated in FIG. 3.

FIG. 4 is a circuit block diagram of main control unit 10. As shown in FIG. 4, IR receiver 460 receives input signals from remote control unit 12. RF switch 404 receives an input video signal from a cable TV source, antenna 406 or an input video signal from cable box 408. "RF Out" connector 400 from modulator 402 provides an output video signal for TV receiver 20. As mentioned above, the output video signal is typically modulated on either channel 3 or 4. Main control unit 10 can be used to switch off cable box 408, when main control unit 10 is programmed to exclude from viewing video signals from cable box 408. Switching off cable box 408 can be achieved by setting RF switch 404, which sends a disabling signal from RF port 410. Alternatively, if a cable channel is permitted to be viewed without restriction, RF switch 404 is set enabled. When enabled, the video signal from cable box 408 is routed from RF switch 404 to modulator 402. In particular, line 414, which couples RF OUT port 416 on RF switch 404 provides the video signal to RF IN port 418 of modulator 402.

Assuming viewing of a cable channel is to be limited, tuner 420 receives cable input signal from RF switch 404, selects the specified channel (e.g. channel 180) and frequency shifts the video signal of the specified channel to become an IF (intermediate frequency) signal for allowing amplification and AGC (automatic gain control). The IF signal is then demodulated by demodulator 422 to obtain the audio and video broadband signals. The audio and video broadband signals are then coupled to audio/video matrix 424. In addition to the audio and broadband signals from tuner 420, audio/video matrix 424 also receives an input video signal 426 from a video VCR. Audio input signals from a VCR are received through left channel and right channel audio input ports 428 and 430. Input port 432 of audio/video matrix 424 also receives a video signal from an auxiliary system, such as a video game player. Examples of video game players for audio/video matrix 424 include any system from SEGA®, NINTENDO® or other video game system. The auxiliary system is plugged into video/audio matrix 424 to be centrally controlled by main control unit 10. Thus all audio/video inputs that a child would be able to watch may be under supervision using the system of the present invention.

Monitor video out and monitor-left and right audio output port 434 can transmit the broadband signals and audio signals to a monitor with broadband and left channel/right channel audio capability (TV/monitor). Alternatively, for monitors without the broadband and left channel/right channel audio capability, the audio/video signal is transmitted through "RF OUT" port 400 of modulator 402 on channel 3 or 4, according to the selected position of slide switch 322 (FIG. 3).

Real-time clock 436, a commercially available integrated circuit, keeps track of wall-clock time, i.e. time of day, days and months. Microprocessor 438 controls operation of main control unit 10, including tuner 420, according to previously input control data stored in random access memory (RAM) 445. Three seven-segment displays 440 and stereo audio control 442 controlled by the microprocessor 438 are used to indicate channel selection and selected audio volume level.

Graphics generator 446 is an integrated circuit controlled by microprocessor 438 for retrieving and generating various graphical images to be displayed on the monitor. Microprocessor 438 provides the appropriate graphical images on the display screen under software control. When a user goes into program mode, the video signal from all of programming sources is cut off, and main control unit 10 displays graphical images under the program mode. The data and programs for generating the graphical images may be stored in any portion of memory 448, i.e. electrically programmable read-only memory (EPROM), RAM or read-only memory (ROM) 448. The rendered graphical images may be stored on graphics chip 446, or preferably stored external to graphic chip 446, e.g. stored graphic memory 450.

The above-mentioned memory devices contain the various graphical images necessary for soliciting user commands, such as positioning the cursor, selecting the date, or counting down the video signal (i.e. keeping track of a maximum length of time a child is allowed to watch TV). Assuming stored graphic memory 450 stores all of the graphical images to be displayed on the screen, graphic generator 446 renders the graphical image requested by microprocessor 438. The graphical images are then transmitted to video/audio matrix 424 in a video signal and output to the monitor or through modulator 402 on the selected channel 3 or channel 4.

Power supply 452 receives an input 110 volts power supply, and output one of several selectable AC voltages. When TV receiver 20 is plugged into main control unit 10, the AC power to TV receiver 20 can be controlled by switched AC control circuit 456. Current sensor 454 senses the output current to determine if TV receiver 20 is on or off. Both the VCR and TV may be turned on or off by IR transmitter 458. Current sensor 454 monitors the current increases and compares the increases to a predetermined level. Microprocessor 438 reads that level and determines if the VCR or TV is turned on, and may send out a command to IR transmitter 458 to turn on or off the VCR or TV. Memory comprising EPROM, RAM and ROM 448 may be used to store the firmware for microprocessor 438. Alternatively, the firmware may be embedded into microprocessor 438.

Figure 5:
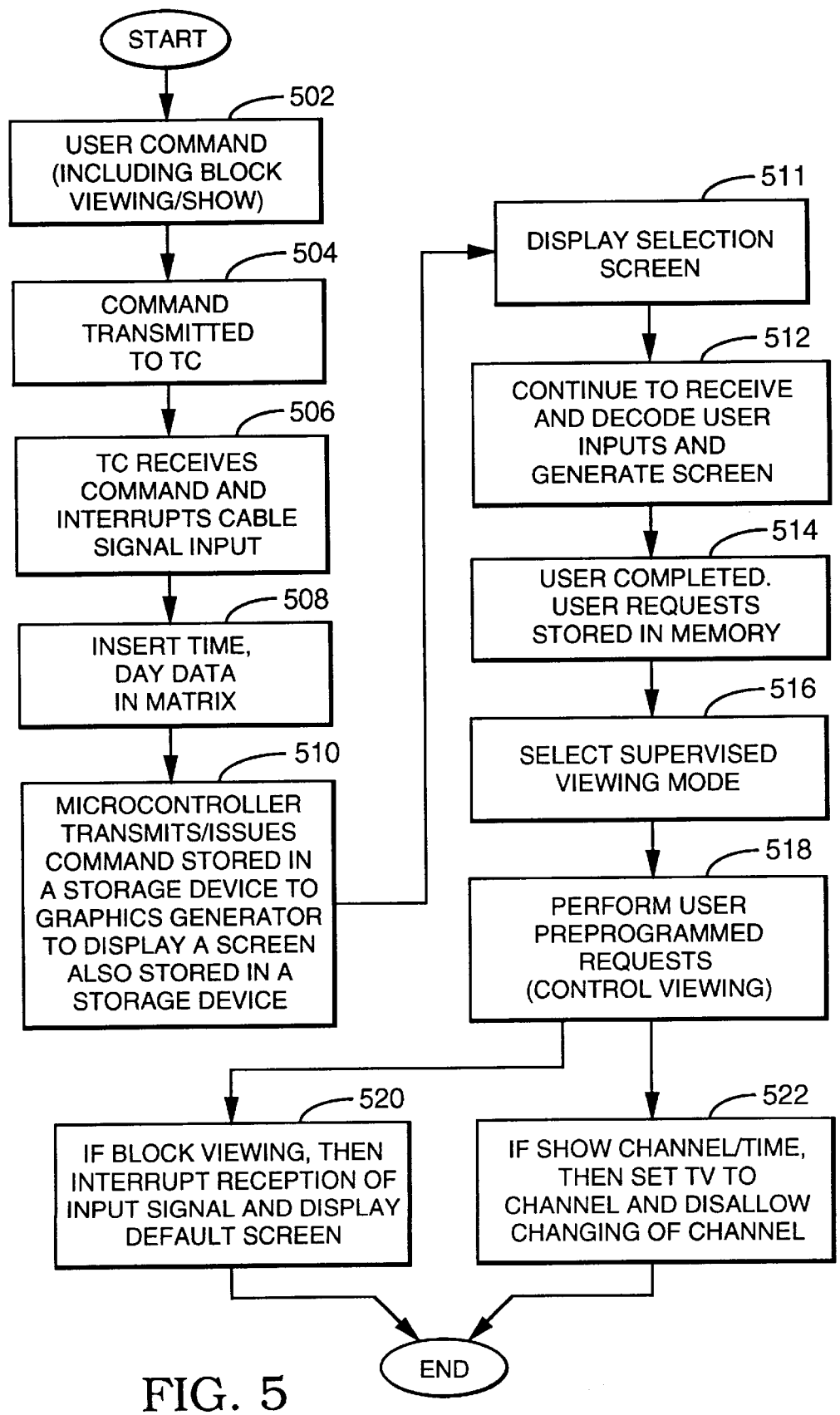
FIG. 5 is a flow diagram of general steps followed by the entertainment system of the present invention.

FIG. 5 is a flow diagram illustrating the general steps followed by the system of the present invention. In step 502, a user sends a command via hand-held remote control unit 12 (or through the keypad of main control unit 10). In step 504, remote control unit 12 transmits a signal to main control unit 10 to go into program mode. In step 506, main control unit 10 cuts off the video signal current displayed on TV receiver 20. In step 505, using real-time clock 436, main control unit 10 determines the time, and date, and inserts the data into a matrix to be displayed onto the screen. The time bar may display a time range close to the actual time selected. In step 510, the microprocessor 438 transmits a command to graphics generator 446 to display the selection matrix of the present invention.

Step 512 represents a loop in which the user inputs commands, such as moving the cursor to a square, or selecting a time/channel bar. In step 512, microprocessor 438 reads the command, decodes the command and performs the task and sends the command to graphics generator 446 to update the screen image displayed. Step 512 is executed repeatedly until the user requests the current data be kept in the memory of main control unit 10. In step 516, when the supervised viewing mode is selected by the user, microprocessor 438 reads the time and determines if the memory has any user programming commands stored.

In step 518, microprocessor 438 retrieves the preprogrammed user requests and perform the requested tasks as appropriate. In step 520, if a user requests that a viewing is to be blocked, the reception of the composite input signal is interrupted and a default image (e.g. "THIS CHANNEL IS BLOCKED") is displayed on the TV monitor 20A. In step 522, if the user requests that a specified channel is to be shown at a specified time, then TV receiver 20 is provided the video signal of the selected channel at the specified time. During this time, main control unit 10 ignores any request entered from remote control unit 12 or keypad 26 for changing the channel viewed. The various ways to program microprocessor 438 are described below.

Figures 6A, 6B:
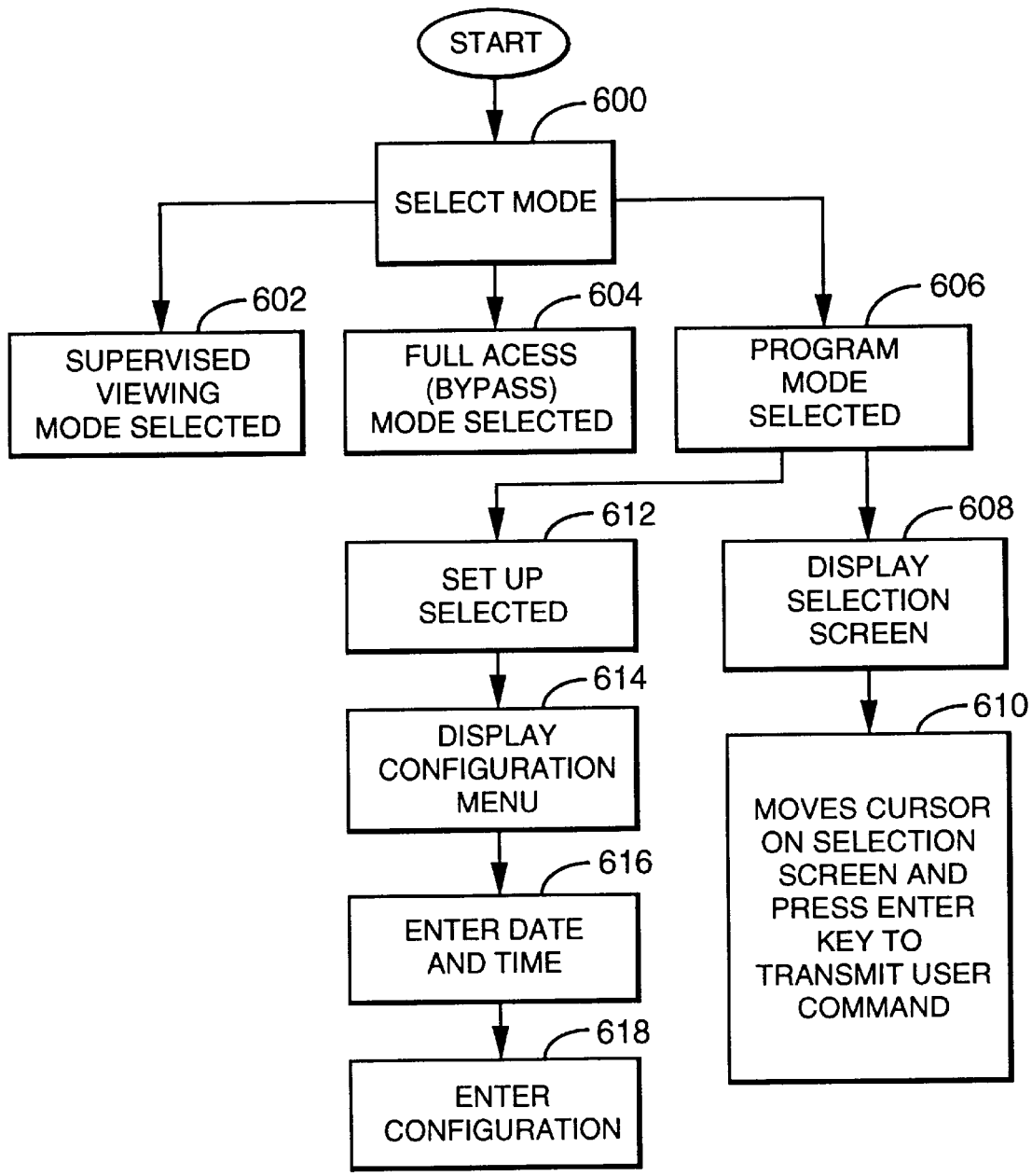
FIG. 6a is a flow diagram of selection of different modes available through an exemplary embodiment of the present invention.
FIG. 6b illustrates a portion of an exemplary set-up display.

FIG. 6a is a flow diagram illustrating the different modes under which main control unit 10 operates. In block 600, the "select" key is pressed on either main control unit 10 or remote control unit 12. Block 602 represents selection by the user of the supervised viewing mode. Under the supervised viewing mode, main control unit 10 permits television viewing only during specified times, on the specified channels, and within the time limit previously programmed. Thus, a parent can completely block a specific channel, completely block use of the TV during selected times, block a selected program by blocking a channel during a selected time, block any combination of channels, time, and programs, and set a total time limit on the number of viewing hours per day, week, or month. During a blocked time or when the viewing time limit has been exceeded, main control unit 10 cuts off transmission of the video signal to the TV receiver 20, and displays instead a default message such as "THIS CHANNEL IS BLOCKED." During an unblocked time in the supervised viewing mode, main control unit 10 will power the TV when the "On-off" key is pressed. Main control unit 10 permits any channel which is not blocked to be viewed. If a blocked channel is selected during the supervised viewing mode, main control unit 10 causes a "Not Available" message to be displayed on television monitor 20A. According to the present invention, if a video signal from a blocked channel is encoded under the EIA Standard, "Recommended Practice for Line 21 Data Service", promulgated by the Engineering Department, Electronic Industries Association, described in ANSI/EIA-608-1994, main control unit 10 is able to block such a channel, even if the incoming video signal is tampered with and masqueraded as a video signal from a permitted channel. This is because, under the EIA standard, channel identification (i.e. call letters and native channel) can be provided in a data packet transmitted during the vertical blanking interval between frames, or "line 21". Main control unit can identify the source of the video signal by examining this data packet in line 21 and comparing the channel identification information with the programmed list of blocked channels.

Step 604 represents selection of the "full access" mode. Here, main control unit 10 does not restrict selection of any channel or impose any time limit, thereby functioning merely as a remote control unit tuner.

Step 606 represents selection of the program mode. In program mode, main control unit 10 allows the user to selectively block TV viewing times, channels and programs and to set a total time limit under which a child is allowed to watch TV programs. To enter into the program mode, a user uses keyswitch 300, or enters on-screen the PIN to select the program mode. In step 608, main control unit 10 causes a selection screen to be displayed. In step 610, in which the user selects from the selection screen, a user moves the cursor displayed on the screen around the programming screen using the four arrow keys (e.g. keys 316) on either main control unit 10 or remote control unit 12 and presses the "enter" key to make a selection.

As the cursor moves around on the screen, the screen area containing the cursor changes in brightness (flickers), so that the user can easily see the cursor, regardless of whether a color or black and white TV receiver is used. When the user presses the "enter" key, the cursor changes again in color and brightness, to provide a feedback to acknowledge the user's pressing the "enter" key. In this embodiment, the cursor always sits fully in a position where the user can make a choice. That is, the user can only move the cursor to portions of the screen where a choice can be made. The cursor stops at the top, bottom, left, and right extremes of the screen, and does not roll around. Of course, as a matter of design choice, the cursor can be designed to operate in a "wrap around" manner. For example, the cursor at the right most portion of the screen may be displayed at the left most portion of the screen upon an attempt by the user to move the cursor further to the right. Similarly, the cursor can also be designed to scroll the row or column it is positioned at, upon an attempt by the user to move the cursor further past the borders of the matrix.

As indicated by block 612, while in the program mode, a user may press the set-up button on either main control unit 10 or remote control unit 12. In response to the user's pressing the set-up button, in step 614, main control unit 10 displays a configuration set-up menu in the middle of the programming screen displayed on television monitor 20A. The configuration set-up screen is shown in FIG. 6b. In step 616, main control unit 10 initially places the cursor at the first digit of the time entry. To set the time and date, the user moves the cursor to the appropriate position to enter time and date digits using number keys.

Main control unit 10 automatically forwards the cursor to the next position after the user presses each digit. The user may press the "Enter" key to toggle the time between AM and PM. When the time is correctly set, the user presses the down or right arrow key to move to the first date digit. In step 618, after the last year digit is entered, the cursor moves to the Input entry. Each press of the Enter key advances through the sequence of supported input signal selections, which include: "Antenna", "STD Cable", "HRC Cable" and "IRC Cable". To leave the configuration menu and to store the input configuration data, the Setup key is pressed again (step 618).

Figure 7:
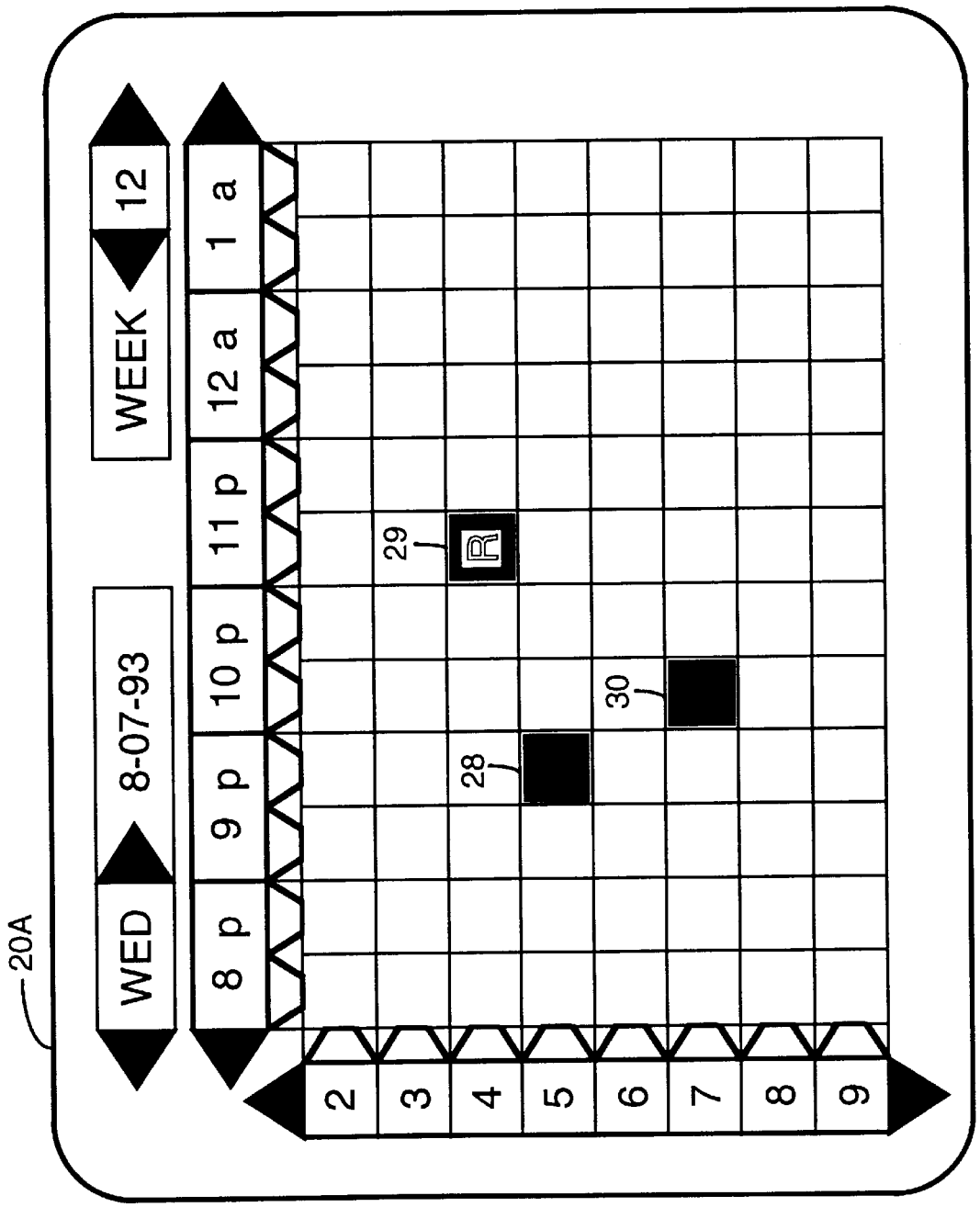
FIG. 7 is an exemplary set-up data displayed on a cell matrix of a special set-up display on the TV/video viewing system.

FIG. 7 illustrates a programming matrix pattern which appears on monitor 20A of TV receiver 20. Time is displayed in half hour steps along the X-axis at the top of the screen, while channel numbers are displayed in along the Y-axis at the left-most column on the screen. The keypad of main control unit 10 and the remote control unit 12 is used to move within the screen display and to select cells on the screen display. In each cell ("square"), different commands can be issued. The issued commands are identified by different colors and shading details. For example, a solid red stripe across a row of the programming matrix indicates the user's command to block the corresponding channel for the corresponding time segments spanned by the stripe, a solid green stripe across a row of the programming matrix indicates the user's command to allow viewing for the time segments spanned by the stripe, a red brick pattern indicates the user's command to block a single event, green brick may indicate the user's command to allow viewing of a single event, etc. Furthermore, a letter can be shown in a cell. For example, the letter "R'" indicates activation of the VCR for recording for the duration of the cell. To illustrate, FIG. 7 shows cell 28 (red) blocks channel 5 for the period 9:30–10:00 PM, cell 29 is set to record channel 4 on a VCR from 11:00 to 11:30 PM, and cell 30 (green) allows channel 7 for the time period 10:00–10:30 PM.

Figure 8:
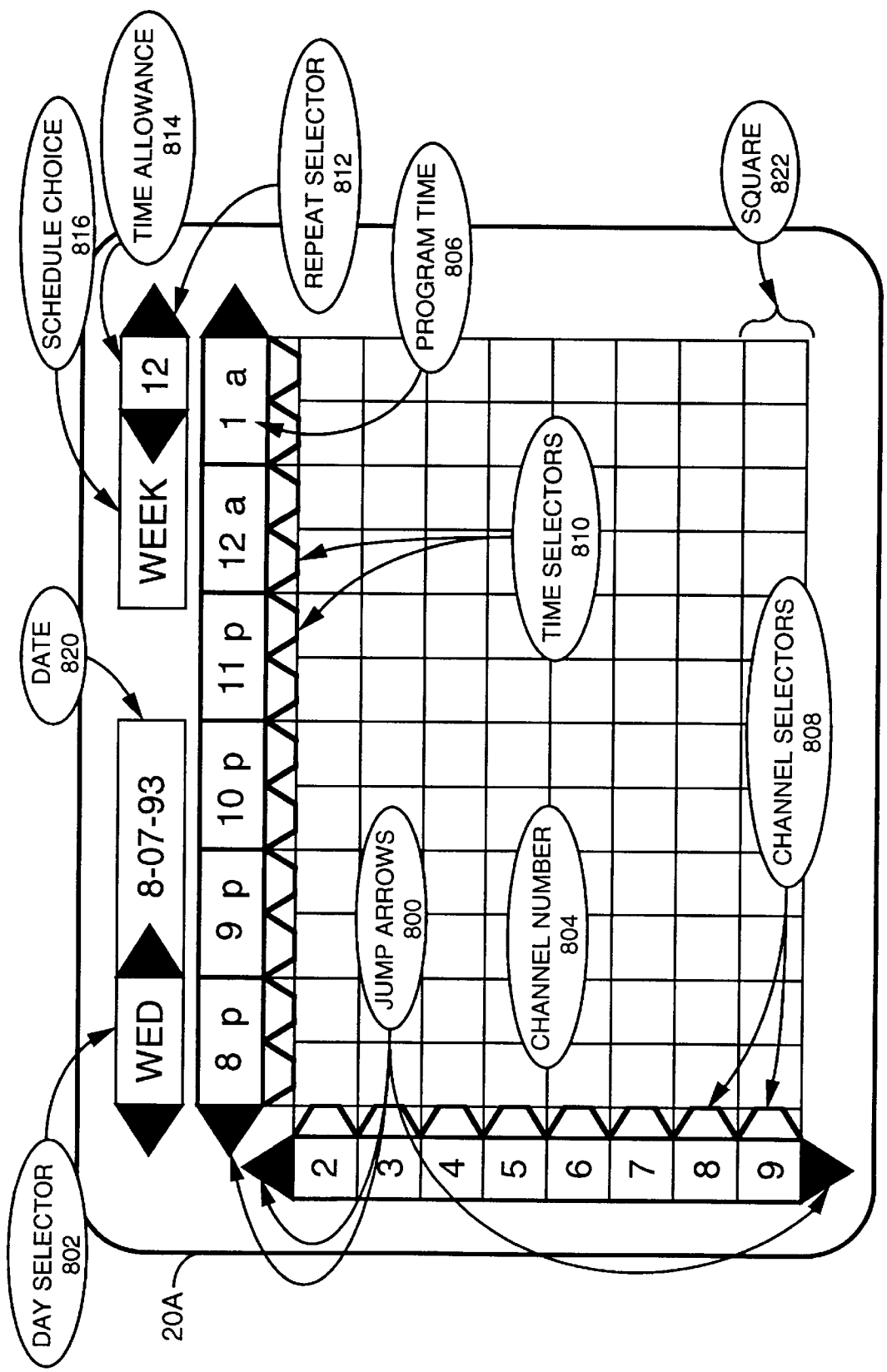
FIG. 8 illustrates exemplary key to symbols that may be illustrated on an exemplary set-up display.

FIG. 8 illustrates examples of data displayed along with the programming matrix. Jump arrows 800 are provided to allow display of a different range of channels and times. Day selector 802 is a box which shows the day being programmed. The day shown in day selector box 802 may be changed by moving the cursor to one of the jump arrows 800 and pressing the Enter key on either main control unit 10 or remote control unit 12. For each time the Enter key is pressed when the cursor is on the left jump arrow 800, the displayed day scrolls back by one day. For each time the Enter key is pressed, when the cursor is on the right jump arrow 800, the displayed day advances by one day.

Channel number bar 804 illustrates the eight channels that are being programmed. A user selects the jump arrow of the channel number bar to select channels shown on channel number bar 804. Channels selectors 808 located to the right of each channel number on channel number bar 804 may be used to block or unblock a channel for viewing.

Program time bar 806 shows the program times for six hours of the day in half-hour increments. Jump arrows 800 at each end of program time bar 806 selects the hours of the day shown on program time bar 806. The program times being displayed by program time bar 806 is changed by pressing the jump arrows 800 on the left and right sides of program time bar 806. Time selectors 810 under each half-hour of program time bar 806 may be used to block or unblock a time of day for viewing. This feature is similar to channel selectors 808. Repeat selector 812 contains schedule choice 816 and time allowance 814. In schedule choice 816, a user may select "day", "week" or "month". For selection of "Day", a user is able to block programs, channels and time on a one-day schedule. In a "Week" schedule choice, a user may block programs, channels, and time on a day-by-day basis on a one-week schedule. Finally, with a choice of "Month", a user may block programs, channels, and time on a day-by-day basis on a twenty-eight day or four week schedule.

Time allowance 814 displays the remaining time allowance in the preset schedule. Thus, time allowance 814 displays the amount of time the supervised viewing mode allows viewing of television program for the operative schedule period. Date box 820 displays the month, day and year corresponding to the selected day.

Each square 822 in the programming matrix represents a single channel for a single half-hour interval. For each square, a user may program main control unit 10 for one of six functions: "Blocked" for a single event or on a repeat basis, "Clear", "VCR record", or "Show" for a single event or on a repeat basis. A user may place the cursor on one of squares 822 and press the enter key on main control unit 10 or remote control unit 12. Each successive press of the Enter key advances through the command list of "Blocked", "Clear", "Show" or "VCR Record". "Clear" allows unrestricted viewing of the channel for the specified time. At the specified time, main control unit 10 powers on TV receiver 20 and selects the specified channel automatically. Under "Show", main control unit 10 will not permit a child to change channels.

Figure 9:
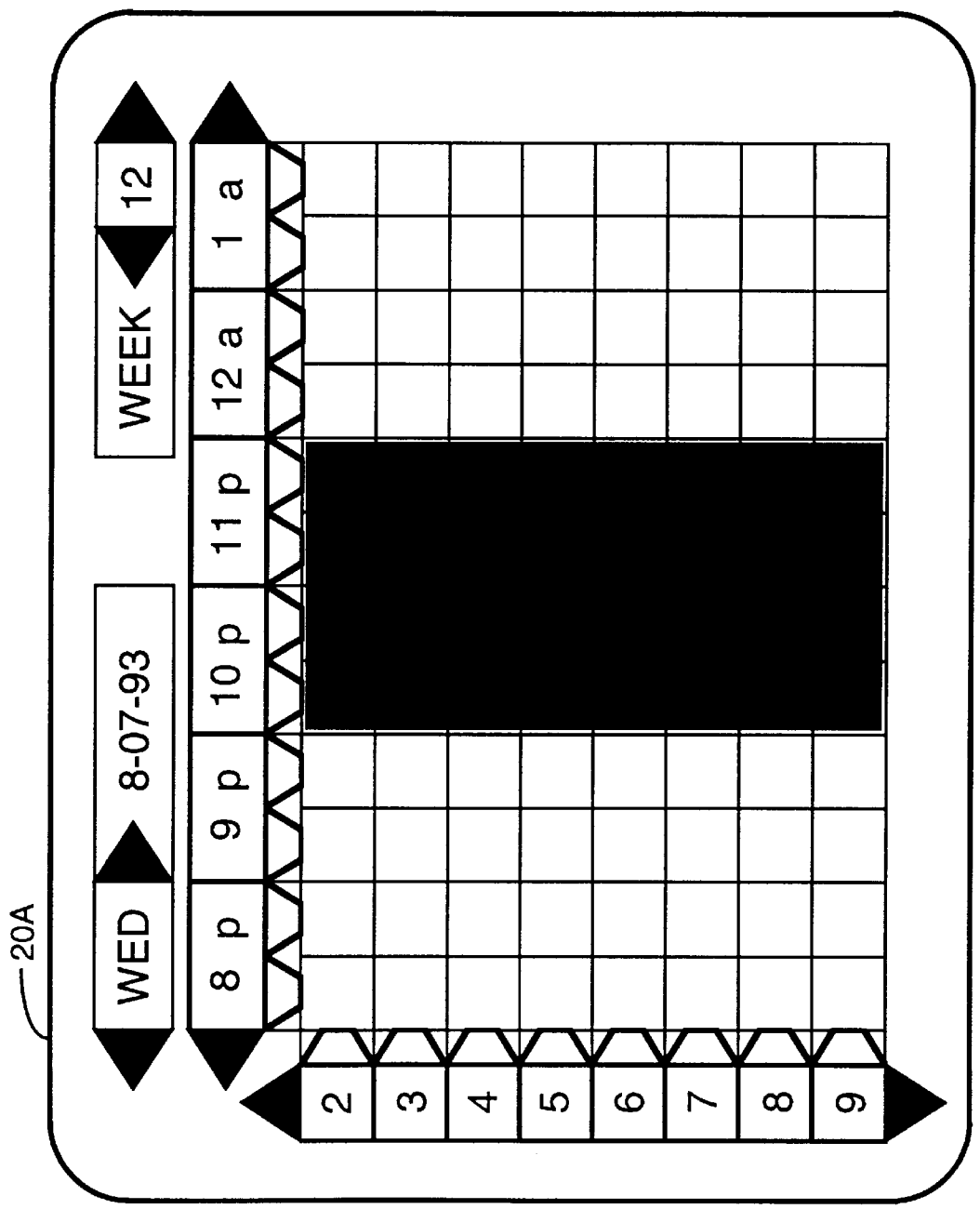
FIG. 9 illustrates an exemplary set-up display indicating all channels blocked for a two hour period.

FIG. 9 illustrates an example of a keypad-entered setup that will block all channels over two hour time period (10–11 am) on a particular day and week as indicated.

Figure 10:
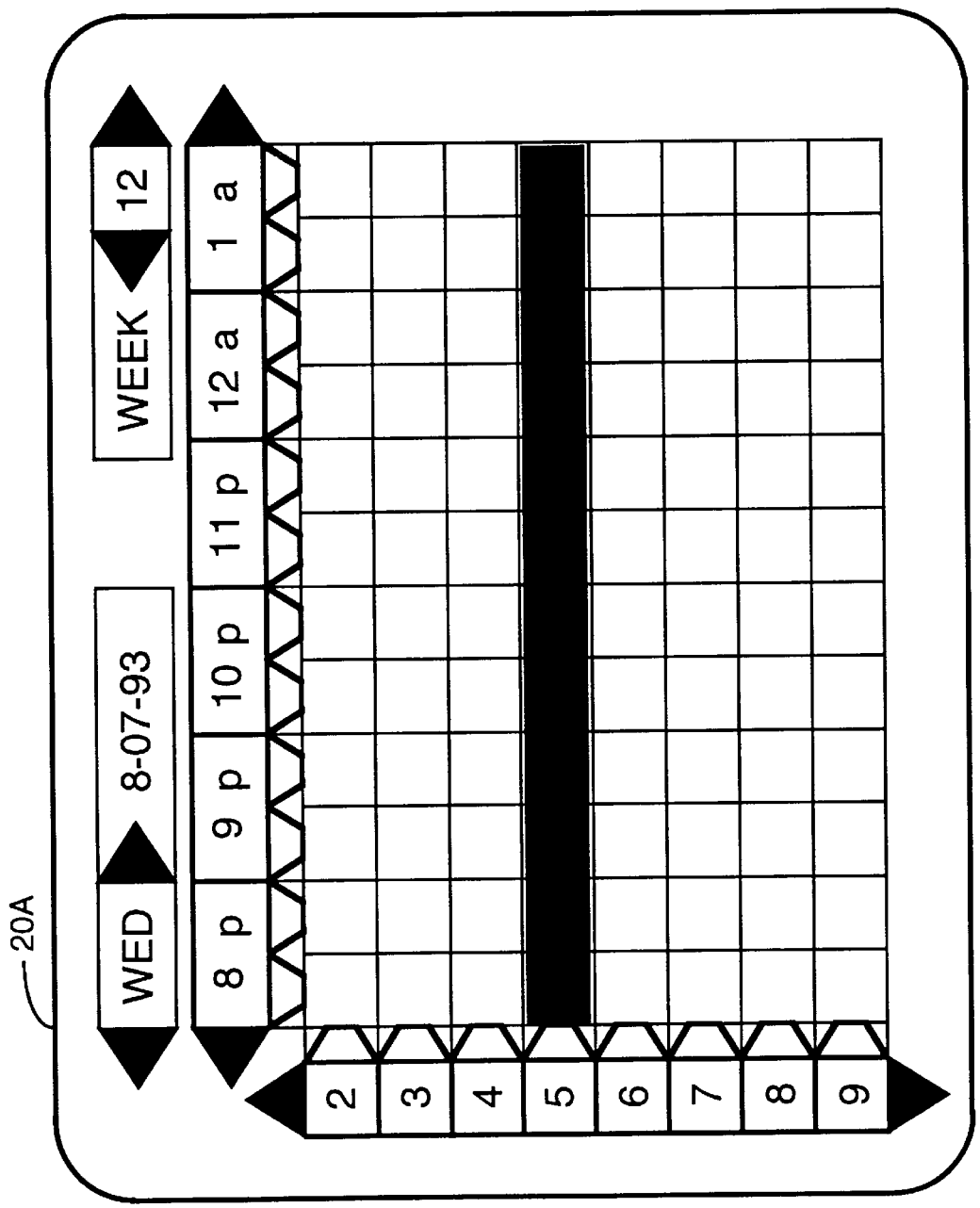
FIG. 10 illustrates an exemplary set-up display indicating one channel (#5) blocked throughout the time period shown.

FIG. 10 illustrates an example of a keypad-entered setup that blocks channel 5 over at least the six hour period on the day and week indicated.

Figure 11:
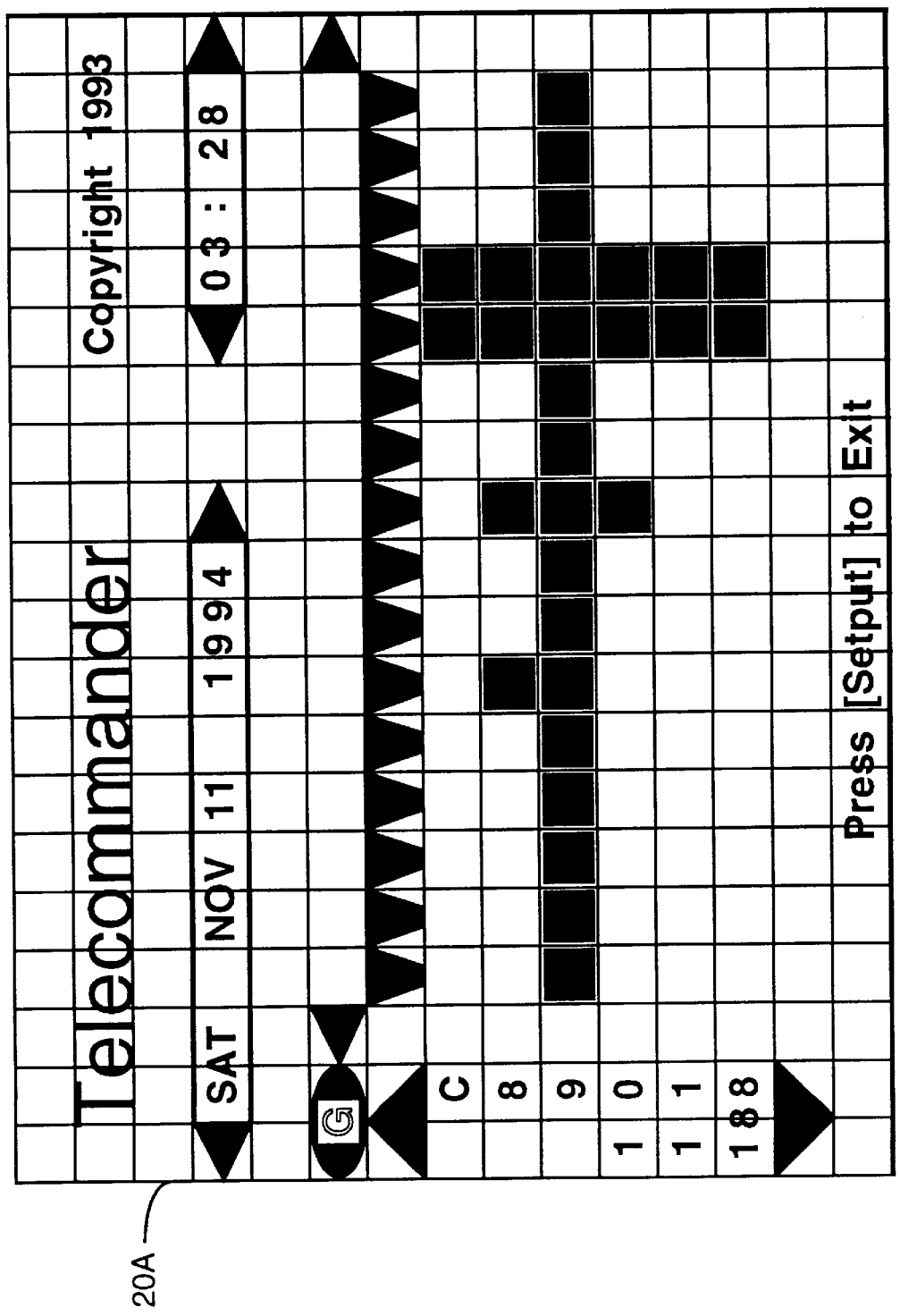
FIG. 11 illustrates at exemplary alternate embodiment of a set-up display.

FIG. 11 illustrates an alternate embodiment of the keypad-entered setup blocking various channels at various times.

What has been described is a method and an apparatus for video viewing supervision. It is anticipated that future TV receivers, VCR's, cable boxes, satellite boxes, video games, mixed media systems and/or the like may be equipped with parental control adaptive facilities such as connector-locks, interfacing adopters, timers, external tuner control capability, etc., that will further co-operate with subject invention in combination therewith.

While certain exemplary embodiments have been described in detail and shown in the accompanying drawings, it is to be understood that such embodiments are merely illustrative of and not restrictive on the broad invention and that this invention not be limited to the specific arrangements and constructions shown and described, since various other modifications may occur to those ordinarily skilled in the art.

What is claimed is:

1. A TV/video supervision system for enabling an authorized user to control viewing of programs carried by video signals of multiple video signal sources, each video signal including channel identification data transmitted during a blanking interval of said video signal, said TV/video viewing supervision system comprising:

an input device for associating said channel identification data with selected viewing times; and a controller unit, receiving commands from said input device, said controller unit comprising:

a television tuner for receiving a video signal, including a circuit for extracting said channel identification data from said video signal;

an output port, coupled to said television tuner, for routing said video signal received at said tuner to a display; and a microprocessor comparing, during each of said selected viewing times, said extracted channel identification data of said video signal with channel identification data associated with that selected viewing time and disabling said output port for the duration of that selected viewing time when said extracted channel identification data matches one of said channel identification data associated with said selected viewing time.

2. A method for implementing a TV/video viewing supervision system for enabling an authorized user to control viewing programs carried by video signals of multiple video signal sources, each video signal including channel identification data transmitted during a blanking interval of said video signal, said method comprising:

using an input device for associating said channel identification data with selected viewing times;

receiving a video signal and extracting channel identification data from said received video signal;

comparing, during each of said selected viewing times, said extracted channel identification data with channel identification data associated with that selected viewing time and disabling output of said video signal to a display for the duration of that selected viewing time when said extracted channel identification data matches channel identification data associated with that selected viewing time.

3. A graphical interface in a system for parental supervision of television viewing, said system including an input device for entering parental supervision commands into said system, said parental supervision commands including a channel block command which prevents access to a specified channel for a specified time duration, said graphical interface comprising:

a controller receiving said commands from said input device; and a graphical image generator providing a graphical image displayable on a television screen, said graphical image including a plurality of cells, each cell corresponding to a time and a channel, and including an identifier in each of said cells to which said channel block command has been associated, said identifier indicating the corresponding channel being blocked during said corresponding time.

4. A graphical interface in accordance with claim 3, wherein said identifier comprises a color.

5. A graphical interface in accordance with claim 3, wherein said identifier comprises shading.

6. A graphical interface in accordance with claim 3, wherein said identifier comprises a pattern.

7. A graphical interface in accordance with claim 3, wherein said identifier comprises an alpha-numeric character.

8. A graphical interface in accordance with claim 3, wherein said system includes a television tuning circuit for receiving a video signal in a specified channel, said system further comprises an output circuit for providing said video signal to a television set.

9. A graphical interface in accordance with claim 8 wherein said controller disables, during said corresponding time, said output circuit from providing the video signal of said channel block command.

10. A graphical interface in accordance with claim 3, wherein said plurality of cells in said graphical image are organized as a two-dimensional matrix.

* * * * *